US012544870B2

(12) United States Patent
Kang et al.

(10) Patent No.: US 12,544,870 B2
(45) Date of Patent: Feb. 10, 2026

(54) X-Y STAGE YAW CORRECTION METHOD AND X-Y STAGE

(71) Applicant: KOREA INSTITUTE OF MACHINERY & MATERIALS, Daejeon (KR)

(72) Inventors: Dong Woo Kang, Daejeon (KR); Hyun Chang Kim, Sejong (KR); Jaeyoung Kim, Daejeon (KR); Kyung Rok Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 349 days.

(21) Appl. No.: 18/267,267

(22) PCT Filed: Dec. 13, 2021

(86) PCT No.: PCT/KR2021/018908
§ 371 (c)(1),
(2) Date: Jun. 14, 2023

(87) PCT Pub. No.: WO2022/131728
PCT Pub. Date: Jun. 23, 2022

(65) Prior Publication Data
US 2024/0009785 A1 Jan. 11, 2024

(30) Foreign Application Priority Data

Dec. 14, 2020 (KR) .................. 10-2020-0174256

(51) Int. Cl.
*B23Q 1/54* (2006.01)

(52) U.S. Cl.
CPC .......... *B23Q 1/54* (2013.01); *B23Q 2210/002* (2013.01); *B23Q 2716/00* (2013.01)

(58) Field of Classification Search
CPC . B23Q 1/34; B23Q 1/36; B23Q 1/621; B23Q 1/56–628; B23Q 2210/002; H02N 2/028
See application file for complete search history.

(56) References Cited

U.S. PATENT DOCUMENTS

2017/0336017 A1* 11/2017 Mosier .................. H02N 2/043

FOREIGN PATENT DOCUMENTS

| JP | 2006-322714 A | 11/2006 |
|---|---|---|
| JP | 2009-52985 A | 3/2009 |

(Continued)

OTHER PUBLICATIONS

International Search Report dated Mar. 24, 2022 for corresponding International Patent Application No. PCT/KR2021/018908, 7 pages.

(Continued)

*Primary Examiner* — Tyrone V Hall, Jr.
(74) *Attorney, Agent, or Firm* — Hauptman Ham, LLP

(57) ABSTRACT

The technology disclosed in the present disclosure is a method for correcting a yaw of an X-Y stage, including: moving an XY moving body in an X-axis or Y-axis direction using an actuator; measuring a yaw, which is a rotational displacement of the moved XY moving body, using a sensor; calculating, by a controller, a rotational stiffness value to be corrected, using the measured yaw data; and adding yaw correction flexures having a stiffness corresponding to the rotational stiffness value to be corrected to the X-Y stage.

6 Claims, 7 Drawing Sheets

(56) References Cited

FOREIGN PATENT DOCUMENTS

| KR | 10-2003-0094887 A | 12/2003 |
| KR | 10-1066846 B1 | 9/2011 |
| KR | 10-2020-0094879 A | 8/2020 |

OTHER PUBLICATIONS

Written Opinion dated Mar. 24, 2022 for corresponding International Patent Application No. PCT/KR2021/018908, 4 pages.

* cited by examiner

101

(a)

(b)

ROTATION CENTER OF A HINGE (a)

ROTATION CENTER OF A HINGE

EXAMPLE OF VARYING A HINGE LINK (b)

X-Y STAGE YAW CORRECTION METHOD AND X-Y STAGE

CROSS-REFERENCE TO RELATED APPLICATION

The present application is a national stage filing under 35 U.S.C § 371 of PCT application number PCT/KR2021/018908 filed on Dec. 13, 2021 which is based upon and claims the benefit of priorities to Korean Patent Application No. 10-2020-0174256 filed on Dec. 14, 2020 in the Korean Intellectual Property Office. All of the aforementioned applications are hereby incorporated by reference in their entireties.

FIELD

The technology disclosed herein relates to a method for correcting a yaw of an X-Y stage and the X-Y stage, and more particularly, to a method for effectively correcting a rotational displacement occurring in a process of linearly moving the X-Y stage in an X or Y axis in various inspections and patterning processes, and the X-Y stage.

BACKGROUND

A linear movement of the X-Y stage in the X axis or Y axis is required in various inspection equipments such as atomic force microscopes or patterning process equipments. However, when moving the X-Y stage in an actual process, not only a linear displacement occurs in the X-axis or Y-axis direction, but also a rotational displacement error called yaw occurs. In this case, a high precision linear movement of the X-Y stage becomes difficult due to a yaw, and efficiency and performance of the entire process may be deteriorated. Accordingly, a need for a correction method capable of correcting such a rotational displacement error is gradually increasing.

The present disclosure aims to solve the above problems and other problems related thereto.

An example object of the technology disclosed herein is to provide a method for correcting a yaw that occurs when linearly moving an X-Y stage.

Another example object of the technology disclosed herein is to provide an X-Y stage to which a yaw correction method is applied.

Technical objects to be achieved by the method for correcting a yaw of an X-Y stage of the present disclosure are not limited to the aforementioned objects, and other objects not mentioned will be evidently understood by those skilled in the art to which the present disclosure pertains from the following description.

SUMMARY

One embodiment is a method for correcting a yaw of an X-Y stage, including: moving an XY moving body in an X-axis or Y-axis direction using an actuator; measuring a yaw, which is a rotational displacement of the moved XY moving body, using a sensor; calculating, by a controller, a rotational stiffness value to be corrected, using the measured yaw data; and adding yaw correction flexures having a stiffness corresponding to the rotational stiffness value to be corrected to the X-Y stage.

In the method, moving the XY moving body again in the X-axis or Y-axis direction by adding the yaw correction flexure so as to simulate a degree of yaw suppression may be further included.

In the method, the actuator may be a piezo-electric (PZT) actuator.

In the method, the sensor may be a capacitance displacement sensor.

In the method, the yaw correction flexure may be a leaf-spring or hinge structure, and the leaf spring or hinge structure may have a specific length, width, and thickness to have a stiffness corresponding to the rotational stiffness value to be corrected.

Another embodiment is a computer program stored on a medium comprising computer readable instructions configured to perform the operations of any claim among claims 1 to 5.

Still another embodiment is an X-Y stage, including: an XY moving body for moving in an X-axis direction or a Y-axis direction by mounting a workpiece; an actuator for actuating movement of the XY moving body; an XY flexure for controlling the movement of the XY moving body; and a fixed body fixed during the movement of the XY moving body and having an interior opened in a polygonal shape including at least four sides to accommodate the XY moving body, and at least one accommodating groove may be formed on each side of the fixed body.

The X-Y stage may further include: a yaw correction flexure accommodated in the accommodating groove formed on the each side of the fixed body.

The accommodating groove may be formed by two on the each side, and the yaw correction flexure may be located inside the accommodating groove capable of reducing yaw movement of the XY moving body among the plurality of accommodating grooves.

The leaf spring or hinge structure of the yaw correction flexure may have a specific length, width, and thickness to have a stiffness corresponding to a rotational stiffness value to be corrected of the XY moving body.

Technical Effect

The method for correcting a yaw of an X-Y stage according to an embodiment of the technology disclosed in this specification has the following effects.

The present disclosure may provide a method for effectively correcting a rotational displacement generated in the linear movement of the X-Y stage.

Therefore, by moving the X-Y stage again after correcting the rotational displacement, it is possible to improve the precision of the entire process.

Effects which may be obtained by the present invention are not limited to the aforementioned effects, and other technical effects not described above may be evidently understood by a person having ordinary skill in the art to which the present invention pertains from the following description.

BRIEF DESCRIPTION OF DRAWINGS

In order to better understand the drawings cited herein, a brief description of each drawing is provided.

MODE FOR INVENTION

Figure 1:
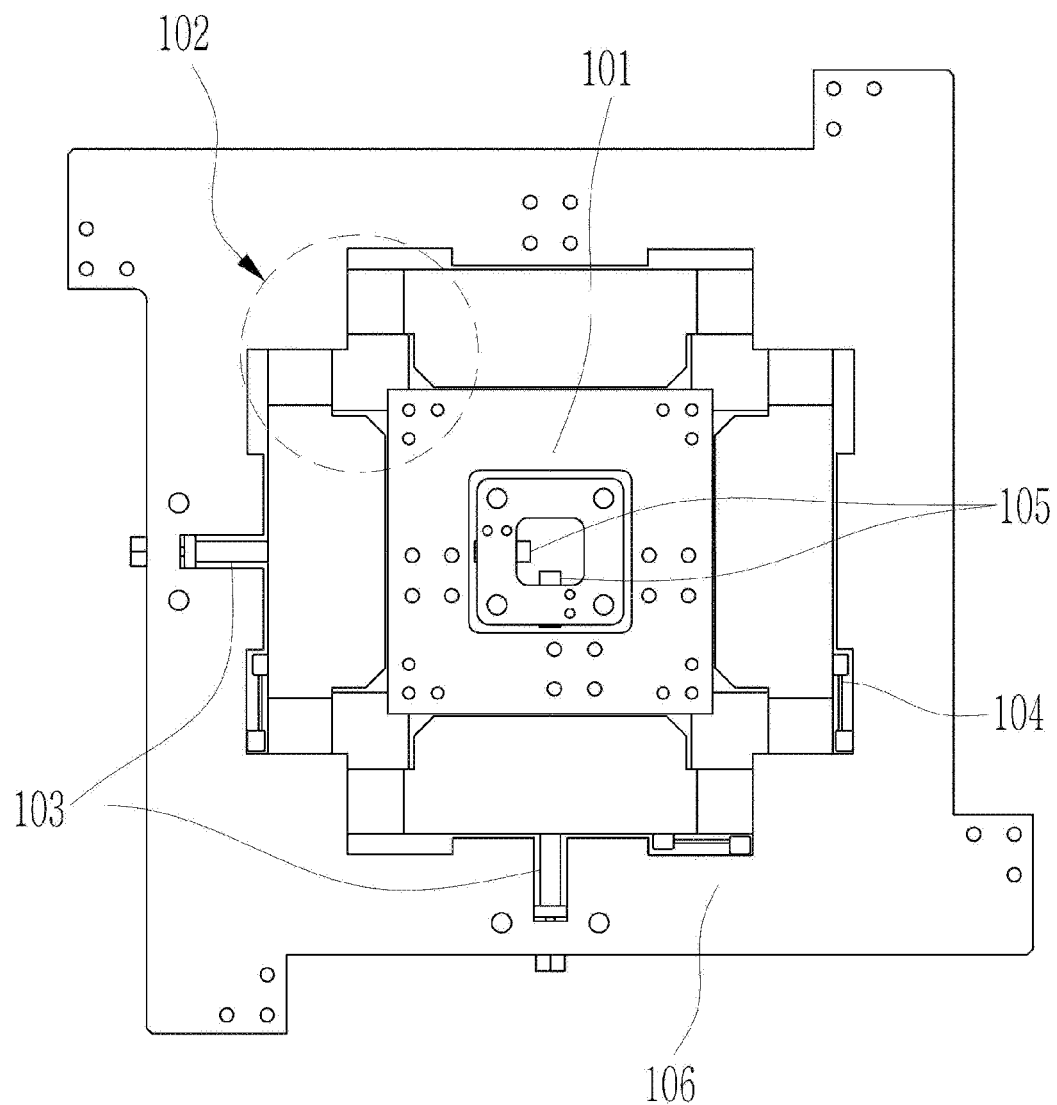
FIG. 1 shows a configuration of an X-Y stage and a yaw correction flexure according to an embodiment of the technology disclosed herein.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

In the following description, detailed descriptions of well-known functions or configurations will be omitted since they would unnecessarily obscure the subject matters of the inventive concept. In addition, terms used in the specification, 'first', 'second', etc. can be used to describe various components, but the components are not to be construed as being limited to the terms.

Furthermore, if one component is described as being "connected" or "coupled", or the like, with another component in the present specification, the one component may be directly connected or coupled with said another component; however, it should be understood that it may also be connected or coupled via a further component in the middle, unless otherwise described.

In the present specification, regarding an element represented as a "unit", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

The expressions such as "first", "second", or the like used in various embodiments of the disclosure may modify various elements regardless of order or importance, and do not limit corresponding elements. For example, a first element may be termed a second element, and similarly, a second element may be termed a first element without deviating from the scope of the disclosure.

Hereinafter, a method for correcting a yaw of an X-Y stage according to a preferred embodiment will be described in detail.

FIG. 1 shows a configuration of an X-Y stage and a yaw correction flexure according to an embodiment of the technology disclosed herein.

In FIG. 1, it is shown that the X-Y stage may move linearly in either the X-axis or Y-axis direction. This is implemented by moving the XY moving body 101 in the X-axis or Y-axis direction. For the linear movement of the XY moving body 101, an actuator 103 may apply a driving force in the X-axis or Y-axis direction. The actuator 103 may be a piezo-electric actuator (PZT) or other actuator capable of applying a driving force.

In addition, in order to precisely control the linear movement of the XY moving body 101, an XY flexure 102 may be included. The XY flexure 102 is an elastic body, and may have low stiffness in the Y-axis or X-axis direction when linearly moving in the X-axis or Y-axis direction.

In FIG. 1, a fixed body 106 is fixed without moving during the linear movement of the XY moving body 101. It may also include a sensor 105, and the sensor 105 may be used to measure a linear displacement. The sensor 105 may be a capacitance displacement sensor, but may be other types of sensors capable of measuring a displacement.

Figure 2:
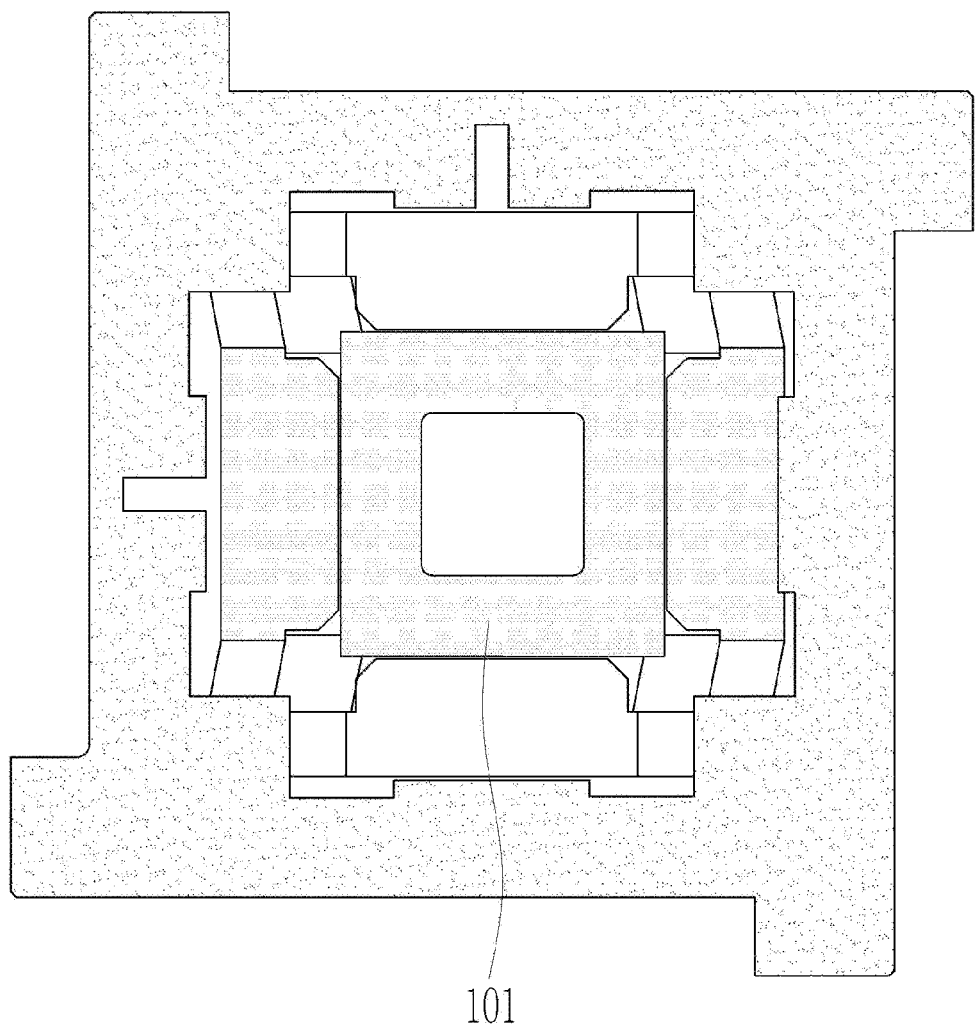
FIG. 2 shows an X-Y stage operating in the manner disclosed herein.

FIG. 2 shows that the XY moving body 101 of the X-Y stage moves linearly in the X-axis direction, and it can be confirmed that precise control is possible as the XY flexures 102 are deformed according to the linear movement.

Figure 3:
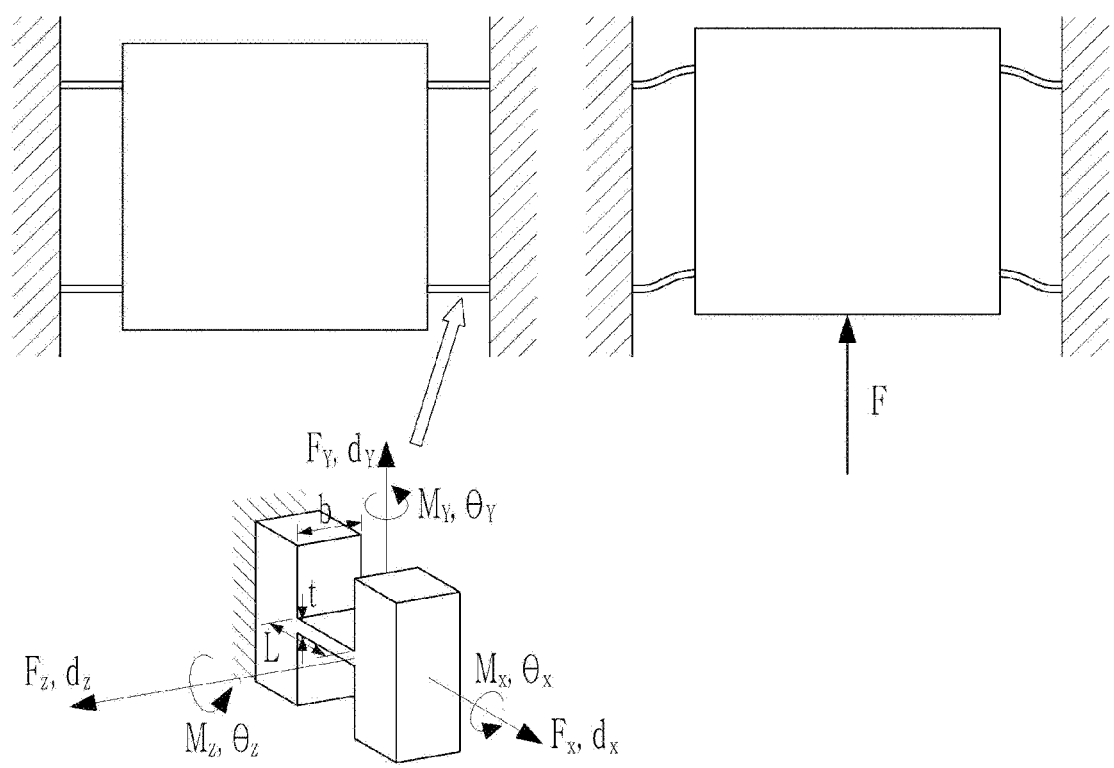
FIG. 3 shows an example of an XY flexure disclosed in the present disclosure.

FIG. 3 shows in detail the deformation of the XY flexure disclosed in the present disclosure. As described in FIG. 1, the XY flexure 102 is formed as an elastic body, and when a driving force is applied thereto in the X-axis or Y-axis direction, the XY flexure 102 deforms itself to precisely control the linear movement. The XY flexure 102 may be configured as a leaf spring or a hinge, and may have a specific length (1), width (b), and thickness (t) according to a required stiffness.

Figure 4:
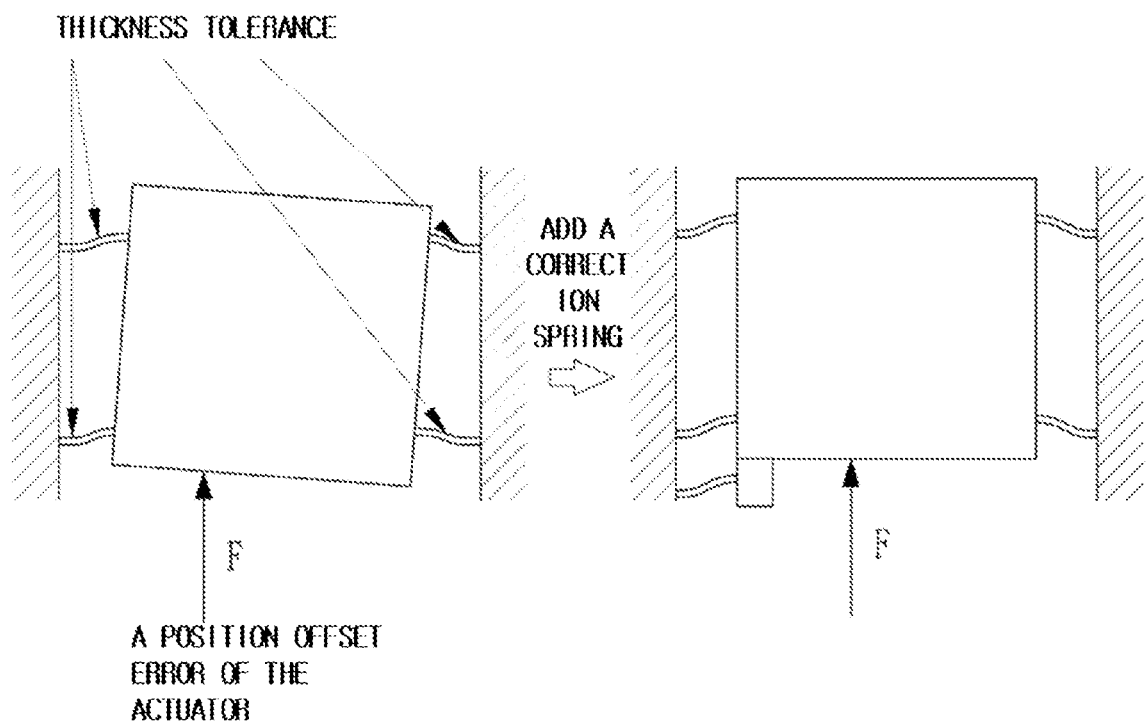
FIG. 4 shows an example of a yaw correction flexure disclosed in the present disclosure.

FIG. 4 shows an example of a yaw correction flexure disclosed in the present disclosure.

In FIG. 4, a rotational displacement other than the linear displacement may occur in an actual process, unlike an ideal process, due to a thickness tolerance of the XY flexure 102 or a position offset error of the actuator. In this case, FIG. 4 shows that the rotational displacement may be corrected by adding yaw correction flexures 104 presented in the present disclosure.

Figure 5:
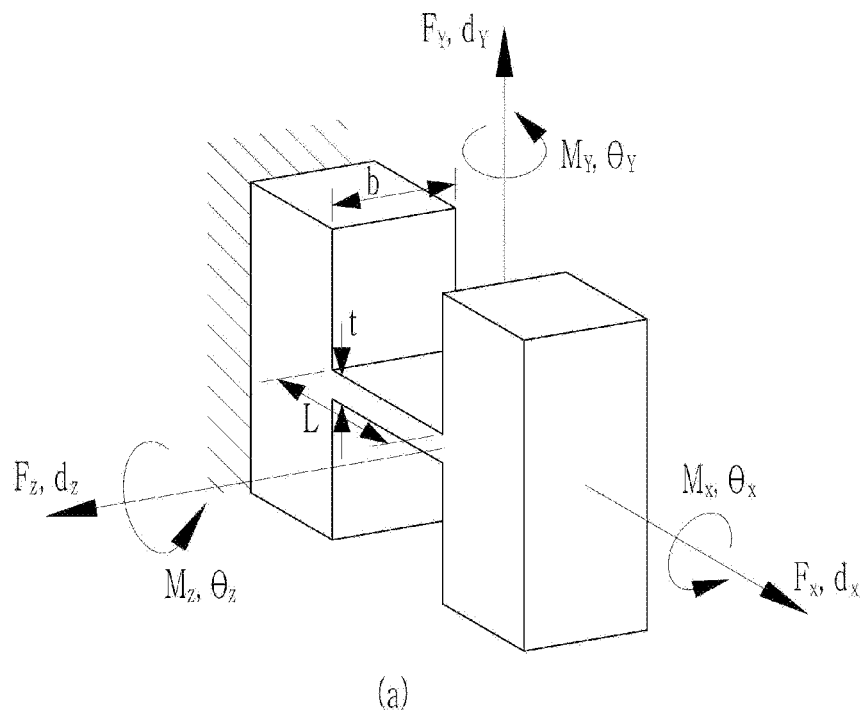
FIG. 5 shows a specific form of a leaf spring disclosed in the present disclosure.
Figure 5:
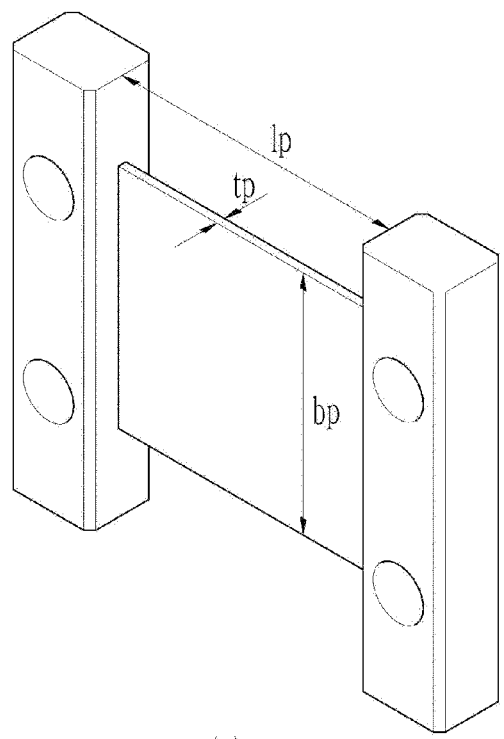

FIG. 5 is an example of the XY flexure 102 and the yaw correction flexure 104 disclosed herein, and shows a specific form of a leaf spring.

The leaf spring may have a specific length, width and thickness to correspond to the required stiffness calculated from the controller. A lower part of FIG. 5 shows the leaf spring viewed from a different angle. The leaf spring has different stiffness depending on a specific length, width and thickness and may be modified to suit the specific length, width, and thickness.

Figure 6:
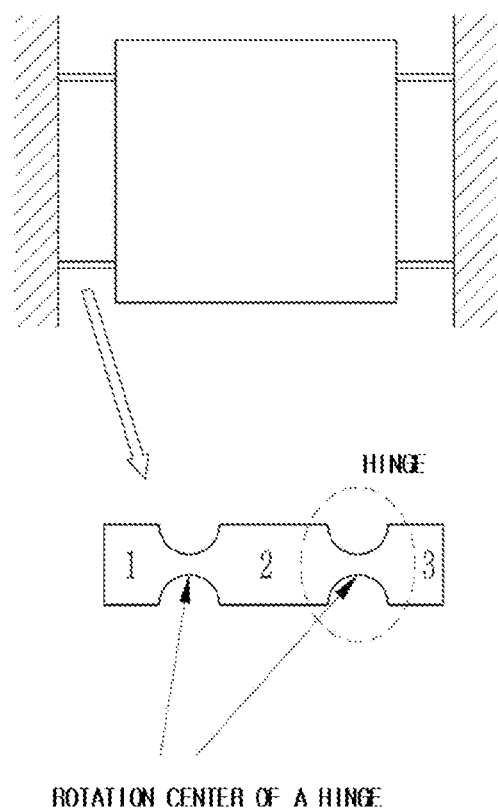
FIG. 6 shows an example of a shape and modification of a hinge structure disclosed in the present disclosure.
Figure 6:
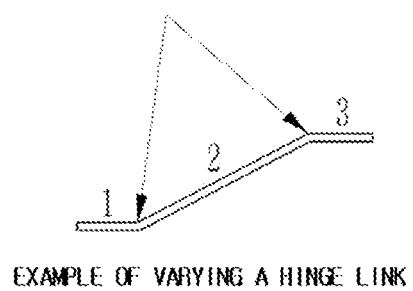

FIG. 6 shows an example of a shape and modification of a hinge structure disclosed in the present disclosure.

Similar to the example of FIG. 5, the XY flexure 102 and the yaw correction flexure 104 may be replaced with the hinge structure of FIG. 6. The hinge structure includes a rotation center as shown in FIG. 6 (*a*), and the rotation center may be deformed as shown in FIG. 6 (*b*). When a driving force is applied to the XY moving body, the hinge structure is deformed based on the rotation center to precisely control the linear movement of the X-Y stage.

Again, referring to FIG. 1, the method for correcting the yaw of the X-Y stage starts with an operation in which the XY moving body 101 is moved in the X-axis or Y-axis direction by using the actuator 103. In the course of the linear movement, a rotational displacement θz is generated in the XY moving body 101 unlike an ideal case, and the yaw sensor 105 may measure this rotational displacement.

As a next operation, the controller calculates a rotational stiffness value to be corrected by using the measured yaw data. Subsequently, a yaw correction flexure 104 having a stiffness value corresponding to the rotational stiffness value may be selected.

The selected yaw correction flexure 104 may then be added to the X-Y stage. In the movement operation of the X-Y stage, the rotational displacement caused by the thickness tolerance of the XY flexure 102 and the position offset error of the driver may be appropriately corrected by adding the yaw correction flexure 104 to a position where a stiffness is insufficient. Thereafter, an operation of confirming whether appropriate correction has been performed by linearly moving the XY moving body 101 in the X-axis or Y-axis direction may be further included. The confirmation operation may be performed by simulating a degree to which the yaw is suppressed, and the simulation operation may be repeatedly performed while changing the length, width and thickness of the yaw correction flexure 104. Each operation of the method may be directly performed manually, but may also be performed electronically and automatically through a computer control system.

Figure 7:
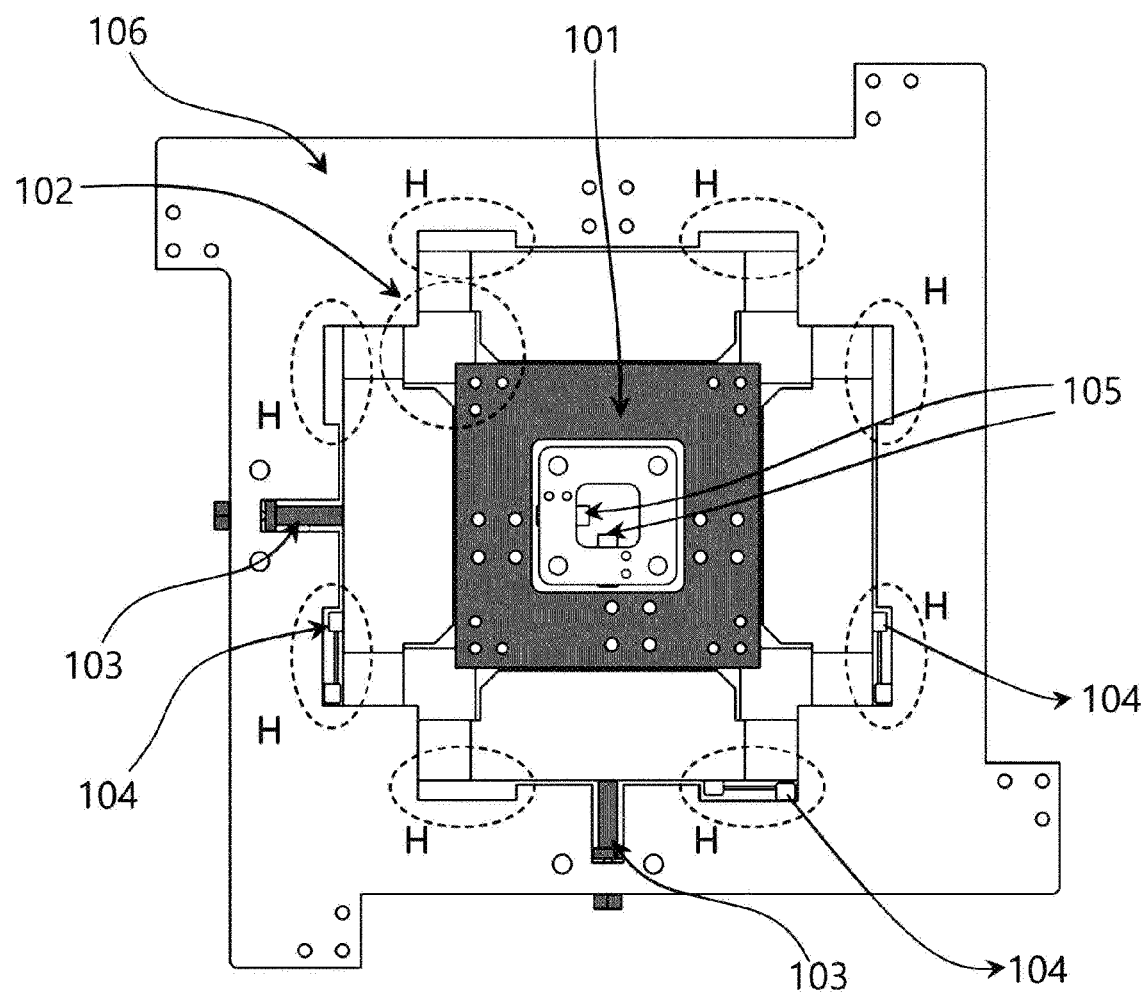
FIG. 7 is a view showing an X-Y stage according to the present disclosure.

FIG. 7 is a view showing an X-Y stage according to an embodiment of the present disclosure.

Referring to FIG. 7, the X-Y stage according to the embodiment of the present disclosure includes the XY moving body 101, the XY flexure 102, the actuator 103, the yaw correction flexure 104, the sensor 105, and the fixed body 106.

The XY moving body 101 may have a workpiece mounted thereon, and may linearly move in the X-axis direction or the Y-axis direction. The workpiece may include, for example, a micro lens, a semiconductor wafer, and the like, and may be an object requiring processing precision in the scale of several nanometers.

The actuator 103 is inserted into the fixed body 106 and may be a motor or a piezo actuator. The actuator 103 may finely move the XY moving body 101 in the X-axis direction or the Y-axis direction according to the driving of the actuator.

The XY flexure 102 is a component for precisely controlling the linear movement of the XY moving body 101, and the XY flexure 102 may be an elastic body. The XY flexure 102 may have a low stiffness in the X-axis or Y-axis direction when linearly moving in the X-axis or Y-axis direction. Such an XY flexure 102 may be configured as a leaf spring or a hinge.

As described above with reference to FIG. 1, the fixed body 106 is fixed without moving during the linear movement of the XY moving body 101. Meanwhile, the sensor 105 may be disposed inside the XY moving body 101. The sensor 105 is a sensor that measures the linear displacement. The sensor 105 may be a capacitive displacement sensor, but is not limited thereto, and may be various types of sensors capable of measuring the displacement.

The fixed body 106 according to the present disclosure may be configured with an open interior to accommodate the XY moving body 101 therein. The inner open space of the fixed body 106 may be a polygonal shape including at least four sides.

In addition, at least one accommodating groove (H) may be formed on each side of the inside of the fixed body 106. For example, referring to FIG. 7, it is shown that two accommodating grooves H are formed on each side of the inside of the fixed body 106, and thus, a total of eight accommodating grooves H may be formed. That is, a plurality of accommodating grooves H may be formed inside the fixed body.

The yaw correction flexure 104 according to the present disclosure may be disposed in at least one accommodating groove H of the plurality of accommodating grooves H. Such a yaw correction flexure 104 may be a configuration for correcting the yaw movement of the XY moving body 101, which occurs according to the thickness tolerance of the XY flexure 102 or the position offset error of the driver 103, and the like. Therefore, the yaw correction flexure 104 may be disposed in the accommodating groove H at an appropriate position capable of reducing the yaw movement after measuring the actually occurring yaw movement.

The yaw correction flexure 104 according to the present disclosure may be a leaf spring. If the yaw correction flexure 104 is implemented as a leaf spring, the yaw correction flexure 104 may have a specific length, width, and thickness to correspond to the required stiffness calculated from the controller as described above. The yaw correction flexure 104 according to the present disclosure may be replaced with a hinge structure.

In order to effectively control the methods described above, a computer program including instructions related to the control of the systems and methods may be further included. The computer program is stored in a data storage medium, and instructions for executing the methods described above are read through a computer processor according to a value inputted by a user or a set environment.

The devices described above and control therefor may be implemented in hardware components, software components, and/or combinations of hardware components and software components. For example, the devices and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device that can execute and respond to instructions. A processing device can execute an operating system (OS) and one or more software applications running on the operating system. Further, the processing device may access, store, operate, process, and generate data in response to the execution of software. Although there are cases that have been described in which one processing device is used for the convenience of understanding, it will be appreciated by those of ordinary skill in the art that the processing device may include a plurality of processing elements and/or a plurality of types of processing elements. For example, the processing device may include a plurality of processors or one processor and one controller. Moreover, other processing configurations, such as a parallel processor, are also possible.

The software may include computer programs, codes, instructions, or combinations of one or more of these, and the processing device may be configured to operate as desired, or the processing device may be instructed independently or in combination. The software and/or data may be embodied permanently or temporarily in any type of machine, component, physical device, virtual device, computer storage medium or device, so as to be interpreted by the processing device or to provide instructions or data to the processing device. The software may also be distributed over networked computer systems and stored or executed in a distributed manner. The software and data may be stored on one or more computer-readable recording media.

The methods in accordance with the embodiments may be implemented in the form of program instructions that can be executed via various computer means and recorded in a computer-readable medium. The computer-readable medium may include program instructions, data files, data structures, and the like alone or in combination. The program instructions recorded on the medium may be those specially designed and configured for the embodiments, or those known to and usable by those of ordinary skill in the art of computer software. Examples of the computer-readable recording media include magnetic media such as hard disks, floppy disks, and magnetic tapes, optical media such as CD-ROMs and DVDs, magneto-optical media such as floptical disks, and hardware devices specially configured to store and execute program instructions, such as ROM, RAM, flash memory, etc. Examples of the program instructions include not only machine language codes such as those produced by a compiler, but also high-level language codes that can be executed by a computer using an interpreter or the like. The hardware devices described above may be configured to operate as one or more software modules to perform the operations of the embodiments, and vice versa.

As set forth above, although the embodiments have been described with limited embodiments and drawings, those of ordinary skill in the art can make various modifications and variations from the above description. For example, appropriate results can be achieved even if the techniques described are performed in a different order than the methods described, and/or the components of the systems, structures, devices, circuits, etc., described above are coupled or combined in a form different from the methods described, or replaced or substituted by other components or equivalents.

Thus, other implementations, other embodiments, and those equivalent to the claims also fall within the scope of the claims to be described later.

What is claimed is:

1. A method for correcting a yaw of an X-Y stage, comprising:
    moving an XY moving body in an X-axis or Y-axis direction using an actuator;
    measuring a yaw data, which is a rotational displacement of the moved XY moving body, using a sensor;
    calculating, by a controller, a rotational stiffness value to be corrected, using the measured yaw data; and
    adding yaw correction flexures having a stiffness corresponding to the rotational stiffness value to be corrected to the XY moving body stage.

2. The method of claim 1, further comprising:
moving the XY moving body again in the X-axis or Y-axis direction by adding the yaw correction flexure so as to simulate a degree of yaw suppression.

3. The method of claim 1,
wherein the actuator is a piezo-electric (PZT) actuator.

4. The method of claim 1,
wherein the sensor is a capacitance displacement sensor.

5. The method of claim 1,
wherein the yaw correction flexure is a leaf-spring or hinge structure, and
the leaf spring or hinge structure has a specific length, width, and thickness to have a stiffness corresponding to the rotational stiffness value to be corrected.

6. A computer program stored on a medium comprising computer readable instructions configured to perform the operations of any claim among claims 1 to 5.

* * * * *